United States Patent [19]

Takeda et al.

[11] Patent Number: 4,661,869

[45] Date of Patent: Apr. 28, 1987

[54] DISK RECORDING AND REPRODUCING DEVICE HAVING A DISK LOADING AND SLIDE EJECTOR MECHANISM

[75] Inventors: Kuninobu Takeda; Osamu Shigenai, both of Furukawa, Japan

[73] Assignee: Alps Electric Co., Ltd., Japan

[21] Appl. No.: 738,097

[22] Filed: May 24, 1985

[30] Foreign Application Priority Data

May 25, 1984 [JP] Japan ............................ 59-75743[U]

[51] Int. Cl.$^4$ ............................................ G11B 17/02
[52] U.S. Cl. ....................................................... 360/97
[58] Field of Search ................................... 360/97, 99

[56] References Cited

U.S. PATENT DOCUMENTS 4,562,498 12/1985 Shibata .................................. 360/99

Primary Examiner—Robert S. Tupper
Attorney, Agent, or Firm—Guy W. Shoup

[57] ABSTRACT

A disk recording and reproducing device includes a chassis, a disk holder movably mounted on the chassis for holding an information storage disk, an eject lever slidably mounted on the chassis, a side panel mounted on the chassis, an ejector button mounted on the chassis for actuating the eject lever, a slide member slidably mounted on the side panel substantially parallel to the eject lever and actuatable in response to sliding movement on the eject lever for substantially vertically moving the disk holder between unload and load positions, the eject lever having an engagement tongue projecting toward and engaging the slide member in a direction across the direction in which the slide member is slidable.

4 Claims, 20 Drawing Figures

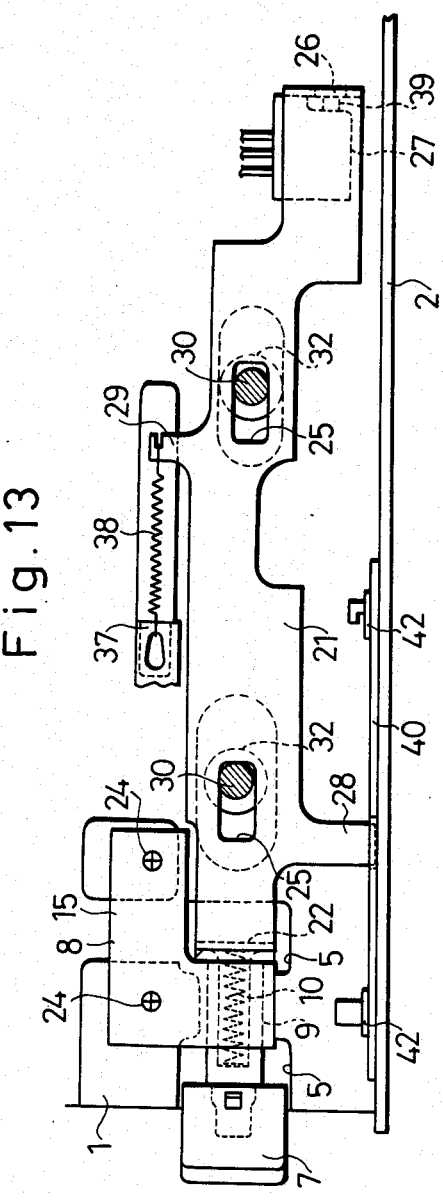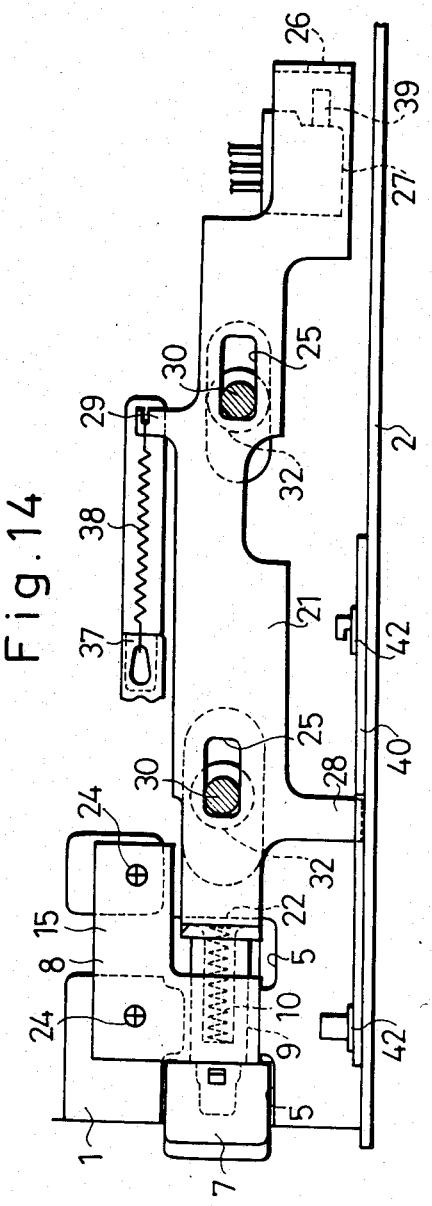

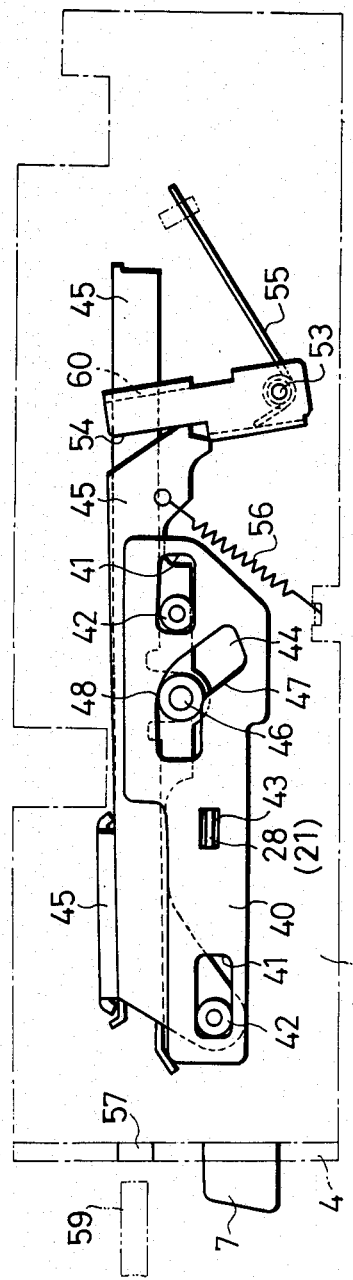
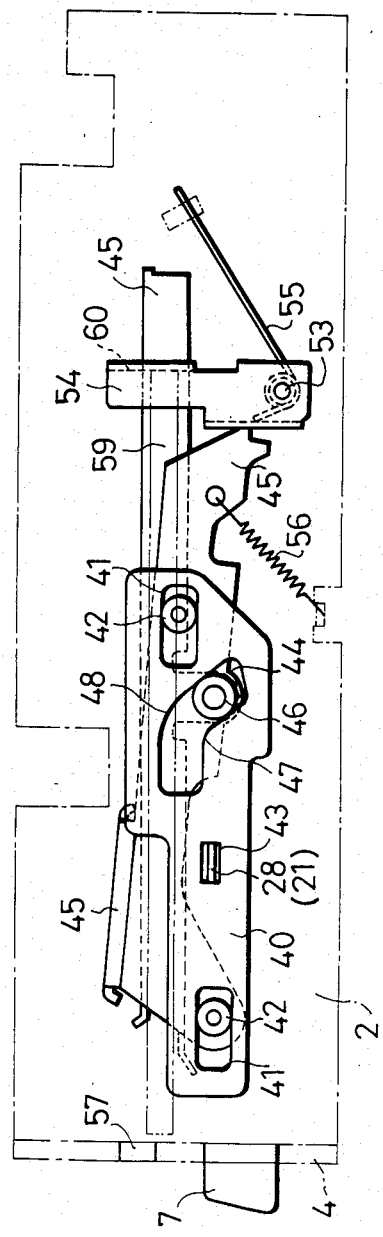

4,661,869

DISK RECORDING AND REPRODUCING DEVICE HAVING A DISK LOADING AND SLIDE EJECTOR MECHANISM

BACKGROUND OF THE INVENTION

The present invention relates to a disk recording and reproducing device for recording and reproducing information in and from magnetic or optical disks.

Conventional disk recording and reproducing devices have an L-shaped slide member composed integrally of a front portion on which an eject button is attached and a slide portion extending perpendicularly from an end of the front portion in a direction in which the slide portion is slidable.

Therefore, the slide member is subjected to a bending moment each time the eject button is depressed, with the result that the tip end of the slide member is pressed against an inner surface of a slide panel to impair the slidability of the slide member. Furthermore, frictional contact between the slide member and the side panel produces particles due to wear of these members, the particles being responsible for preventing smooth movement of various components and adversely affecting reading and writing of information from and on the disk.

SUMMARY OF THE INVENTION

It is an object of the present invention to provide a disk recording and reproducing device having an eject lever and a slide plate which are separate from each other to allow the slide plate to slide well without being subjected to a bending moment and hence to various troubles due to particles which would otherwise be produced by wear on the slide plate.

According to the present invention, there is provided a disk recording and reproducing device including a chassis, a disk holder movably mounted on the chassis for holding an information storage disk, an eject lever slidably mounted on the chassis, a side panel mounted on the chassis, an ejector button mounted on the chassis for actuating the eject lever, a slide member slidably mounted on the side panel substantially parallel to the eject lever and actuatable in response to sliding movement of the eject lever for substantially vertically moving the disk holder between unload and load positions, the eject lever having an engagement tongue projecting toward and engaging the slide member in a direction across the direction in which the slide member is slidable.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 13 is a plan view of an eject lever as located in a standby position;
FIG. 14 is a plan view of the eject lever as located in an ejected position;
FIGS. 19 and 20 are side elevational views showing the manner in which a slide plate operates.

DESCRIPTION OF THE PREFERRED EMBODIMENT

Figure 1:
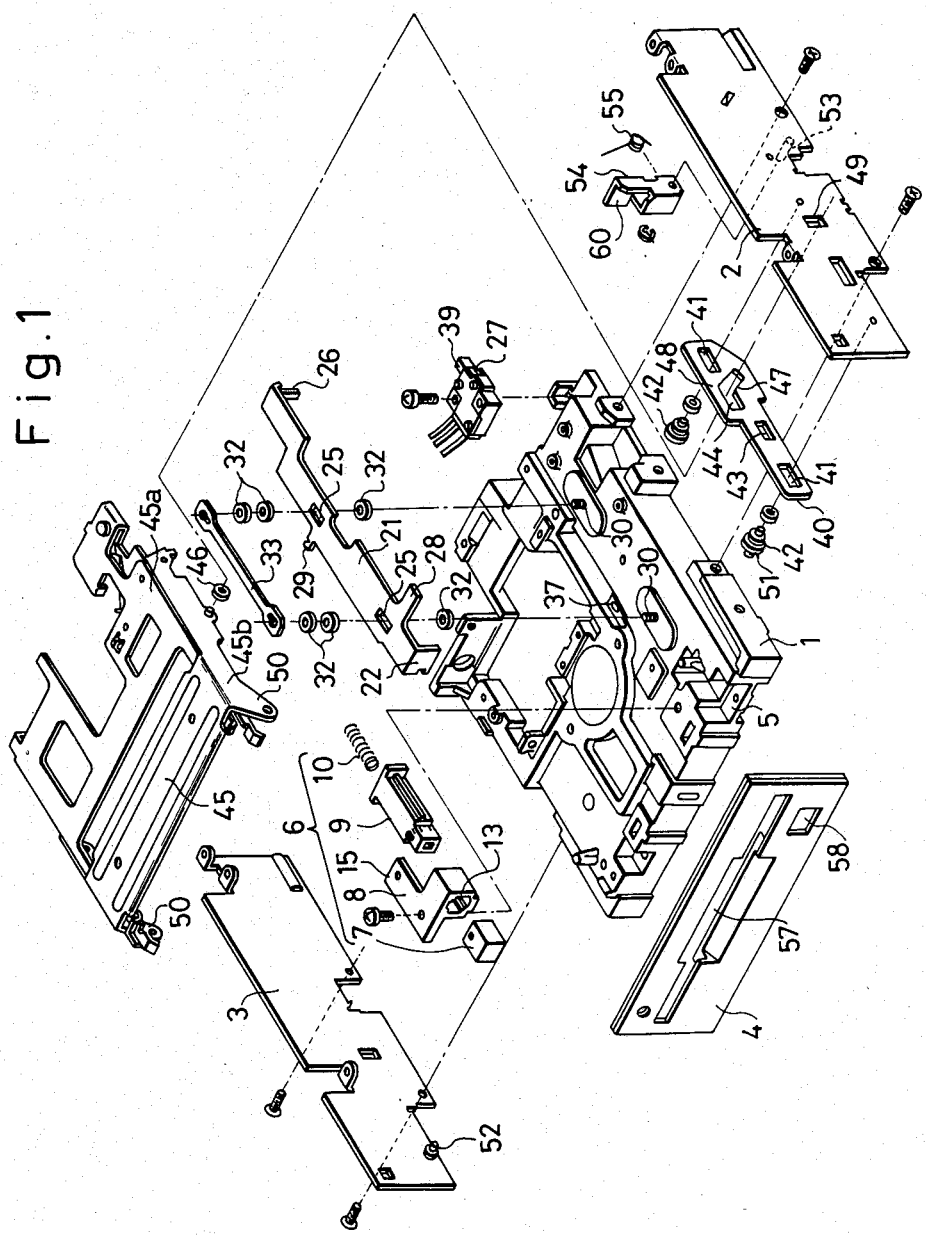
FIG. 1 is an exploded perspective view of a disk recording and reproducing device according to the present invention.

As illustrated in FIG. 1, a disk recording and reproducing device according to the present invention has a chassis 1 comprising an aluminum die casting, first and second side panels 2, 3 attached to opposite sides of the chassis 1, and a front panel 4 attached to a front side of the chassis 1. Since the front panel 4 has a front design which varies from device type to device type, the front panel 4 is attached to the chassis 1 in a final assembling process for the disk recording and reproducing device. Alternatively, where the disk recording and reproducing device is to be assembled in a system device such as a computer, a front panel of the system device doubles as part of that of the disk recording and reproducing device.

The chassis 1 has in its front side a recess 5 in which an eject button unit 6 is accommodated. The eject button unit 6 is composed of an eject button 7, a button holder 8, a slide 9, and a button return spring 10.

Figure 2:
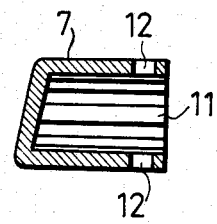
FIG. 2 is a sectional side elevational view of an eject button.
Figure 3:
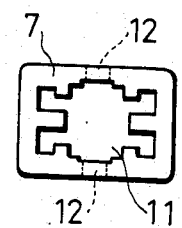
FIG. 3 is a rear elevational view of the eject button.

FIGS. 2 and 3 are illustrative of the eject button 7. The eject button 7 has a cavity 11 opening in its rear end so that a front end of the slide 9 can be force-fitted into the cavity 11. The eject button 7 also has locking holes 12 defined in upper and lower sufaces thereof and communicating with the cavity 11.

Figure 4:
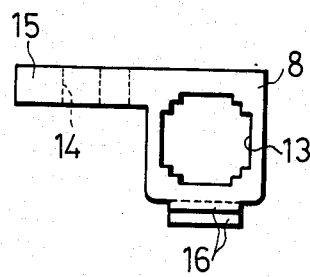
FIG. 4 is a front elevational view of a button holder.
Figure 5:
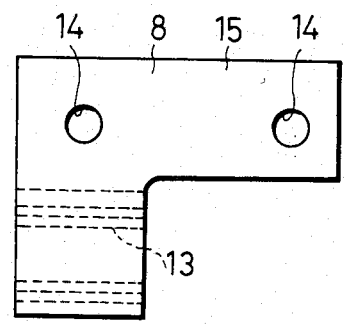
FIG. 5 is a plan view of the button holder.
Figure 6:
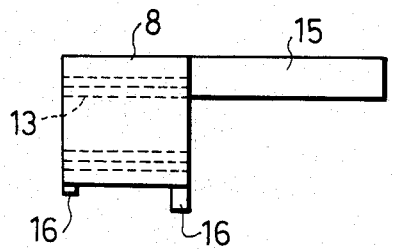
FIG. 6 is a side elevational view of the button holder.
Figure 7:
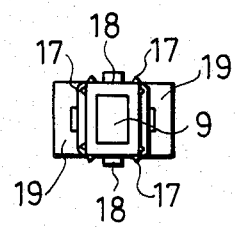
FIG. 7 is a front elevational view of a slide.
Figure 8:
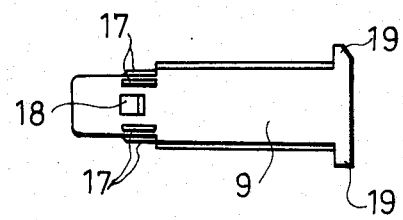
FIG. 8 is a plan view of the slide.

FIGS. 4, 5, and 6 show the button holder 8. The button holder 8 has a guide hole 13 defined therethrough and includes an upper attachment 15 extending laterally and having attachment holes 14. The button holder 8 also has front and rear stoppers 16 projecting downwardly from a lower surface thereof.

Figure 9:
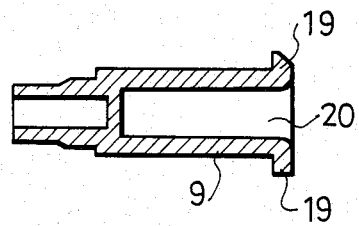
FIG. 9 is a sectional plan view of the slide.
Figure 10:
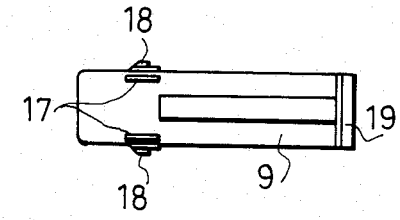
FIG. 10 is a side elevational view of the slide.

FIGS. 7, 8, 9, and 10 illustrate the slide 9. The slide 9 has a plurality of ridges 17 of triangular cross section on sides of a front end thereof, and locking teeth 18 on upper and lower surfaces thereof. The slide 9 also has locking flanges 19 on a rear end thereof. As shown in FIG. 9, the slide 9 includes a spring housing hole 20 defined therein and opening in the rear end thereof.

Figure 11:
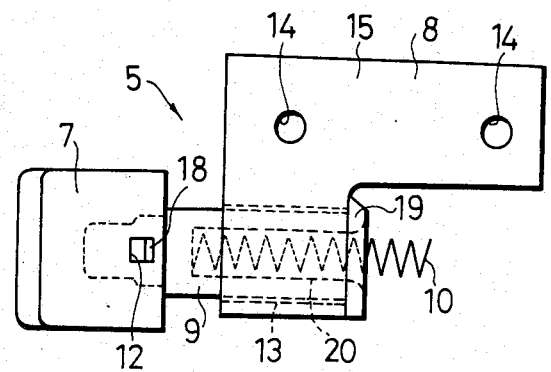
FIG. 11 is a plan view of an eject button unit.

Assembling of the eject button unit 6 will be described with reference to FIGS. 11 and 12. As illustrated in FIG. 11, the front end of the slide 9 is inserted into the guide hole 13 in the button holder 8 until the flanges 19 abut against an end face of the button holder 8 and the front end of the slide 9 projects foward from the button holder 8. The front end of the slide 9 is then force-fitted into the cavity 11 in the button 7 until the locking teeth 18 are locked in the locking holes 12, respectively, in the button 7. When the front end of the slide 9 is forcibly inserted into the cavity 11, the ridges 17 on the slide 9 locally contact inner surfaces of the cavity 11 under high contact pressure. Such pressed engagement of the ridges 17 with the inner surfaces of the cavity 11, together with the engagement of the locking teeth 18 in the locking holes 12, retain the button 7 and the slide 9 firmly together, and the assembly is slidably supported on the button holder 8.

Then, the button return spring 10 is pushed under compression into the spring housing hole 20 in the slide 9. The assembled eject button unit 6 is now inserted in the recess 5 in the chassis 1 as shown in FIG. 12. Before the eject button unit 6 is inserted in place, an eject lever 21 is slidably mounted on the chassis 1 and has its front end bent into a spring seat 22 which is inserted in the recess 5.

Figure 12:
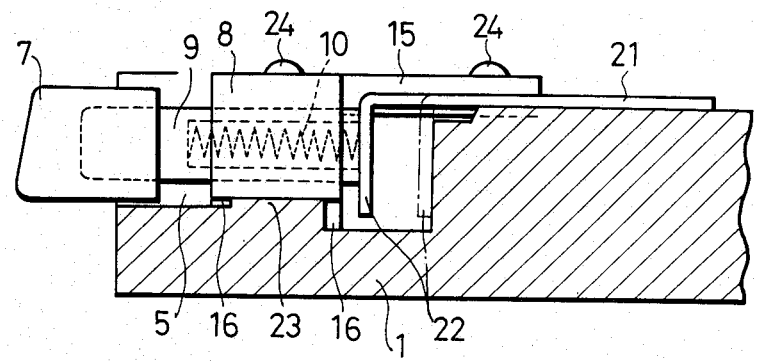
FIG. 12 is a side elevational view of the eject button unit as mounted in place.

As shown in FIG. 12, the bottom of the recess 5 has a positioning land 23 with its front and rear edges engaging the stoppers 16, 16, respectively, of the button holder 8. The attachment 15 of the button holder 8 is fixed to the chassis 1 by screws 24. The eject button unit 6 is now fixed in position to the chassis 1. The button return spring 10 has a rear end resiliently seated on the spring seat 22 of the eject lever 21. The assembly of the eject button 7 and the slide 9 is urged forward without relative wobbling movement under the resilient force of the spring 10.

As illustrated in FIG. 13, the eject lever 21 has two oblong holes 25, 25 defined therein and spaced from each other a certain distance in the longitudinal direction thereof in which the eject lever 21 is slidable. The spring seat 22 projects downwardly from the front end of the eject lever 21, which has a switch operating member 26 projecting downwardly from a rear end thereof. As shown in FIG. 1, the switch operating member 26 is narrower than other portions of the eject lever 21 so that the switch operating member 26 can be bent relatively easily for adjusting the timing of contacting engagement between the switch operating member 26 and a microswitch 27 (described later), that is, the timing of opening and closing of contacts of the microswitch 27, after the device has been assembled.

The eject lever 21 also has an engagement tongue 28 extending toward the first side panel 2, and a spring retainer 29 extending away from the engagement tongue 28.

Figure 15:
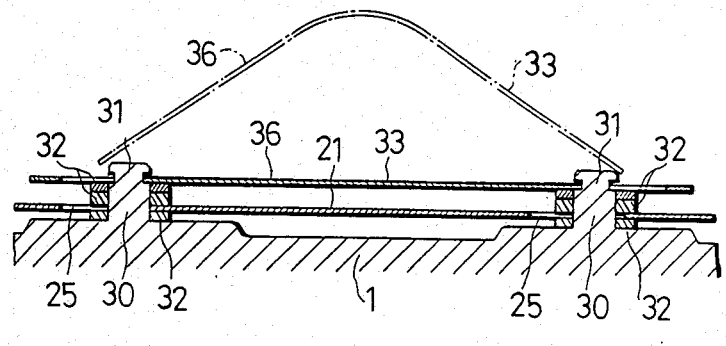
FIG. 15 is a fragmentary cross-sectional view of the eject lever mounted in place.
Figure 16:
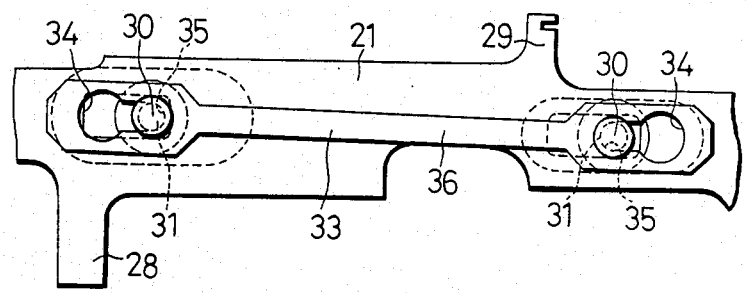
FIG. 16 is a fragmentary plan view of the eject lever mounted in place.

Attachment of the eject lever 21 to the chassis 1 will be described with reference to FIGS. 15 and 16. As shown in FIG. 15, two guide posts 30, 30 project upwardly from the chassis 1 for insertion through the respective oblong holes 25, 25 in the eject lever 21, each of the guide posts 30, 30 having a smaller-diameter portion 31 in the form of a circumferential groove near an upper end thereof. As illustrated in FIGS. 1 and 15, a plurality of washers 32 and the eject lever 21 are successively fitted over the guide posts 30, and then a retainer plate 33 is mounted on the guide posts 30, 30. The retainer plate 33 is made of a resilient thin metal sheet and has wider apertures 34 in opposite ends thereof which are wide enough to allow heads of the guide posts 30 to pass freely therethough and narrower apertures 35 communiating with the wider apertures 34 and disposed inwardly thereof, the narrower apertures 35 having a width which is substantially the same as the diameter of the smaller-diameter portions 31 of the guide posts 30. The narrower apertures 35 are spaced from each other a distance which is substantially the same as or slightly smaller than the distance between the smaller-diameter portions 31. The opposite ends of the retainer plate 33 are interconnected by an intermediate connector 36 which is relatively narrow so as to be bendable easily.

As indicated by the dot-and-dash lines in FIG. 15, the intermediate connector 36 of the retainer plate 33 is bent upwardly with the ends of the retainer plate 33 located downwardly, and the wider apertures 34 are positioned above the guide posts 30. Then, the retainer plate 33 is lowered until the heads of the guide posts 30 enter the wider apertures 34, whereupon the retainer plate 33 is released. The retainer plate 33 springs back to the flat shape as indicated by the solid lines in FIG. 15 to cause the narrower apertures 35 to fit over the smaller-diameter portions 31. Thus, the eject lever 21 is locked by the retainer plate 33 against removal.

Figure 17:
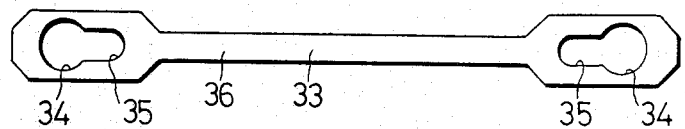
FIG. 17 is a plan view of a retainer plate.
Figure 18:
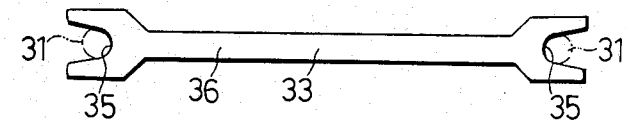
FIG. 18 is a plan view of a modified retainer plate.

FIG. 18 shows a modification of the retainer plate 33. The modified retainer plate 33 includes wide apertures 35 defined in opposite ends thereof and progressively spreading outwardly. The modified retainer plate 33 can be attached in the same manner as the retainer plate 33 of FIG. 17 is mounted. As assembled, the wide apertures 35 are fitted over the smaller-diameter portions 30 of the guide posts 30.

As shown in FIG. 13, a tension spring 38 engages the spring retainer 29 of the retainer plate 33 and a spring retainer 37 on the chassis 1 for normally urging the eject lever 21 in a direction toward an eject standby position. The micrsoswitch 27 is positioned rearwardly and downwardly of the eject lever 21 and has an actuator 39 disposed in confronting relation to the switch operating member 26.

The eject lever 21 is movable in ganged relation to a slide plate 40. As illustrated in FIGS. 1 and 19, the slide plate 40 has two oblong holes 41, 41 defined therein and spaced at a certain interval in the longitudinal direction thereof in which the slide plate 40 is slidable. Rollers 42 disposed respectively in the oblong holes 41 are rotatably mounted on an inner surface of the first side panel 2, so that the slide plate 40 is slidably supported on the first side panel 2 by the rollers 42 in the oblong holes 41.

The slide plate 40 also has an engagement hole 43 defined therein between the oblong holes 41, 41. The engagment tongue 28 of the eject lever 21 is fitted in the hole 43 to connect the eject lever 21 and the slide plate 40 together.

The slide plate 40 has an angular cam slot 44 having a lower slanted edge 47 serving as a lifting cam surface and an upper curved edge 48 serving as a engaging cam surface. As shown in FIG. 1, the first side panel 2 has a vertical restricting groove 49 defined therein in confronting relation to the cam slot 44 in the slide plate 40. A disk holder 45 has an outer side wall centrally on which there is rotatably supported an up-down roller 46 having an inner half inserted in the cam slot 44 and an outer half inserted in the restricting groove 49. The disk holder 49 has front ends 50 one angularly movably supported on a shaft 51 of the front roller 42 and the other angularly movably supported on a shaft 52 projecting from an inner surface of the second side panel 3. The disk holder 45 comprises a swing holder 45a and a load lever 45b.

A lock lever 54 is angularly movably supported by a shaft 53 on an inner rear surface of the first side panel 2. The lock lever 54 is normally urged by a helical torsion spring 55 in a direction to turn forwardly or counterclockwise in FIG. 19.

In FIGS. 19 and 20, a tension spring 56 acts between the first side panel 2 and the disk holder 45 for normally urging the disk holder 45 in a direction toward a load position.

Although not shown, the chassis 1 supports thereon a disk drive mechanism, a mechansim for feeding a carriage on which a magnetic head is mounted, and a circuit board. In a final assembling stage, the front panel 4 (FIG. 1) is mounted on the front side of the chassis 1. The front panel 4 has a disk insertion slot 57 and a button insertion opening 58 defined therein. By attaching the front panel 4 to the chassis 1, the center of the eject button 7 mounted and locked on the chassis 1 is well aligned with the center of the button insertion opening 56, so that the eject button 7 is inserted centrally in the button insertion opening 56 without positional deviation.

Operation of the disk recording and reproducing device up to insertion of a magnetic disk cartridge 59 into the load position will now be described. FIG. 19 shows the position of the parts prior to insertion of the magnetic disk cartridge 59. At this time, the disk holder 45 is in an unload position (upper position) in alignment with the disk insertion slot 57 in the front panel 4, with the rear end of the disk holder 45 engaging the lock lever 54 and positioned thereby. The slide plate 40 together with the eject lever 21 is pushed in a rearmost eject position against the resiliency of the tension spring 38 (FIG. 14), and the up-down roller 46 is positioned between an upper end of the lifting cam surface 47 and the engaging cam surface 48. With the up-down roller 46 thus positioned, the slide plate 40 and the eject lever 21 are held in the eject position without being moved back to the eject standby position, through the engagement between the up-down roller 46 and the engaging cam surface 48.

As the eject lever 21 is held in the eject position, the switch operating member 26 is spaced from the actuator 39 of the microswitch 27 in the same manner as shown in FIG. 14. The microswitch 27 is then turned off. Although the eject lever 21 is in the rear eject position, the eject button 7 projects forwardly from the front panel 4 under the resiliency of the button return spring 10.

Now, the magnetic disk cartridge 59 is inserted through the insertion slot 57 into the disk holder 45. Just before the magnetic disk cartridge 59 is completely inserted, the leading edge of the magnetic disk cartridge 59 engages an abutment surface 60 (FIG. 1) of the lock lever 54. Continued insertion of the magnetic disk cartridge 59 turns the lock lever 59 clockwise against the resiliency of the helical torsion spring 55. Immediately after the magnetic disk cartridge 59 has been inserted, the disk holder 45 is disengaged from the lock lever 54.

The disk holder 45 is now released and pulled downwardly under the force of the tension spring 56 as shown in FIG. 20. The downward movement of the disk holder 45 causes the up-down roller 46 to be lowered off the engaging cam suface 48 while being guided by the restricting groove 49 (FIG. 1) in the first side panel 2. The slide plate 40 is released, and withdrawn together with the eject lever 21 back to the eject standby position (front position) under the force of the tension spring 38 (FIG. 13). Upon return of the eject lever 21, the switch actuating member 26 engages and moves the actutator 39 to close the contacts of the microswitch 27, which then issues a set signal indicating that the magnetic disk cartridge 59 is located in the load position. Thereafter, information is written on or read out of the disk.

The magnetic disk cartridge 59 will be ejected out of the device in the following manner:

When the eject button 7 is depressed in FIG. 13, the slide 9 causes the eject lever 21 to move rearwardly (to the right as shown) as illustrated in FIG. 14. The switch operating member 26 is released from the actuator 39, whereupon the microswitch 27 is turned off and produces no signal. FIG. 14 shows the eject lever 21 as pushed to the eject position.

On the movement of the eject lever 21, the slide plate 40 also moves rearwardly to cause the up-down roller 46 to be lifted by the slanted surface of the lifting cam slot 47 and the restricting groove 49 in the first side panel 2. The disk holder 45 housing the magnetic disk cartridge 59 therein is then moved from the load position to the unload position against the resilient force of the tension spring 56. When the disk holder 45 engages the lock lever 54 as shown in FIG. 19, the up-down roller 46 reaches an upper end of the lifting cam slot 47 to engage the engaging cam surface 48. The disk holder 45 is now held in the unload position, while the eject lever 21 and the slide plate 40 are held in the eject position. The magnetic disk cartridge 59 is then ejected forwardly through the insertion slot 57 by a known eject mechanism (not shown).

Although a certain preferred embodiment has been shown and described, it should be understood that many changes and modifications may be made therein without departing from the scope of the appended claims.

What is claimed is:

1. A disk recording and reproducing device having a chassis including side panels and a front panel with a slot through which a disk is inserted in a horizontal longitudinal direction in the chassis, a disk holder in the chassis for receiving at an unloaded position a disk inserted through the slot in the front panel and movable substantially vertically downward to a loaded position in the chassis, and an ejector mechanism for unloading a disk in the disk holder at the loaded position for ejecting it from the device, comprising:

(a) the disk holder having a front receiving end and a rear engaging end and a disk receiving path defined therein, wherein at least said rear engaging end of the disk holder is biased by biasing means downwardly toward the loaded position;

(b) a lock lever having an abutment surface disposed in said disk receiving path and an engagement portion engageable with said rear engaging end of said disk holder for holding it in the unloaded position against the biasing force of said biasing means, said lock lever being pivotable rearwardly by abutment of an end of a disk inserted in said disk holder against said abutment surface to thereby release said engagement portion from said rear engaging end of said disk holder and allow said disk holder to be moved substantially vertically downward to the loaded position;

(c) the ejector mechanism being mounted in the chassis and including an ejector button projecting from the front panel, and eject lever actuatable by said ejector button so as to be slidable in the horizontal longitudinal direction of the chassis and having an engagement tongue extending transverse to the longitudinal direction toward a side panel of the chassis, and a slide member slidably mounted on the side panel substantially parallel to the eject lever and having an engagement portion for receiving said engagement tongue of said eject lever such that said slide member is slidably in the longitudinal direction of the chassis upon actuation of said eject lever, said slide member further having means engaging a portion of said disk holder for moving said disk holder substantially vertically between the unloaded and loaded positions.

2. A disk recording and reproducing device according to claim 1, wherein said slide member has a pair of oblong holes spaced from each other in a longitudinal direction thereof, said side panel supporting a pair of rollers rotatably disposed respectively in said oblong holes.

3. A disk recording and reproducing device according to claim 2, wherein said slide member has an engagement hole defined therein between said oblong holes, said engagement tongue engaging in said engagement hole.

4. A disk recording and reproducing device according to claim 1, wherein said slide member has a cam slot defined therein, said disk holder supporting a rotatable roller rotatably engaging in said cam slot for moving said disk holder vertically in response to sliding movement of said slide member.

* * * * *